United States Patent
Srivastava et al.

(10) Patent No.: US 7,630,967 B1
(45) Date of Patent: Dec. 8, 2009

(54) JOIN PATHS ACROSS MULTIPLE DATABASES

(75) Inventors: Divesh Srivastava, Summit, NJ (US); Ioannis Kotidis, Lake Hiawatha, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 196 days.

(21) Appl. No.: 11/285,051

(22) Filed: Nov. 22, 2005

(51) Int. Cl.
*G06F 7/00* (2006.01)

(52) U.S. Cl. .......................................... 707/3; 707/100

(58) Field of Classification Search ................. 707/3–5, 707/100
See application file for complete search history.

(56) References Cited

U.S. PATENT DOCUMENTS

| | | | | |
|---|---|---|---|---|
| 5,307,484 A | * | 4/1994 | Baker et al. | 707/102 |
| 5,345,585 A | * | 9/1994 | Iyer et al. | 707/2 |
| 5,469,568 A | * | 11/1995 | Schiefer et al. | 707/2 |
| 5,671,403 A | * | 9/1997 | Shekita et al. | 707/3 |
| 5,680,603 A | * | 10/1997 | Bhargava et al. | 707/2 |
| 6,115,705 A | * | 9/2000 | Larson | 707/3 |
| 6,212,514 B1 | * | 4/2001 | Eberhard et al. | 707/2 |
| 6,477,534 B1 | * | 11/2002 | Acharya et al. | 707/100 |
| 6,643,636 B1 | | 11/2003 | Au et al. | |
| 6,662,175 B1 | * | 12/2003 | Ghazal et al. | 707/2 |
| 6,668,253 B1 | * | 12/2003 | Thompson et al. | 707/10 |
| 6,754,652 B2 | * | 6/2004 | Bestgen et al. | 707/3 |
| 6,904,590 B2 | | 6/2005 | Ball et al. | |
| 6,944,633 B1 | | 9/2005 | Higa et al. | |
| 6,957,222 B1 | | 10/2005 | Ramesh | |
| 6,957,225 B1 | | 10/2005 | Zait et al. | |
| 2001/0049685 A1 | * | 12/2001 | Carey et al. | 707/103 R |
| 2003/0061244 A1 | * | 3/2003 | Hirohata | 707/200 |
| 2003/0167272 A1 | * | 9/2003 | Sinnott, Jr. | 707/100 |
| 2004/0153435 A1 | * | 8/2004 | Gudbjartsson et al. | 707/1 |
| 2004/0260675 A1 | | 12/2004 | Bruno et al. | |

* cited by examiner

*Primary Examiner*—Vincent Boccio
(74) *Attorney, Agent, or Firm*—Jackson Walker L.L.P.

(57) ABSTRACT

Methods, systems and computer instructions on computer readable media are disclosed for optimizing a query, including a first join path, a second join path, and an optimizer, to efficiently provide high quality information from large, multiple databases. The methods and systems include evaluating a schema graph identifying the join paths between a field X and a field Y, and a value X=x, to identify the top-few values of Y=y that are reachable from a specified X=x value when using the join paths. Each data path that instantiates the schema join paths can be scored and evaluated as to the quality of the data with respect to specified integrity constraints to alleviate data quality problems. Agglomerative scoring methodologies can be implemented to compute high quality information in the form of a top-few answers to a specified problem as requested by the query.

14 Claims, 2 Drawing Sheets

JOIN PATHS ACROSS MULTIPLE DATABASES

FIELD

The embodiments relate to methods, systems, and computer instructions on computer readable media for using multiple, join data paths with specified constraints and agglomerative scoring methodologies for providing high quality information derived from large, multiple databases.

BACKGROUND

Relational database systems store data in tables organized by columns and rows. Generally, the tables are linked together by relationships that simplify the storage of data and make complex queries against the database more efficient. Structured Query Language, (SQL) is a standardized language for creating and operating on relational database systems.

A relational database system can include an "optimizer" that plans the execution of SQL queries. For example, if a query requires accessing or "joining" more than two elements or two tables, the optimizer will select the order that the tables are joined to produce the requested result in the shortest period of time or to satisfy some other criteria.

In some cases, a database administrator will define "join paths" to be used that contain one or more frequently accessed columns from one or more tables. The optimizer has a choice of accessing columns or paths, or can add additional "join paths" that can be followed in query execution.

Generally, an optimizer will not identify the top-few answers, or highest quality information, within a join path framework for a very large database without taking a lot of expensive and costly time to evaluate the data, analyze the data in relation to possible data quality problems, such as data inconsistencies or default values, and, then, determine the top-few answers.

Thus, a need exists for an efficient and cost-effective system and method for locating and providing high quality information, such as the top-few answers or solutions to a problem, across multiple, large databases in the presence of data quality problems. Further, a need exists for a system and method for evaluating data quality within and across a large relational database system with respect to specified integrity constraints for identifying data quality problems in order to provide the high quality information or answers unaltered by data quality problems.

The present embodiments meet these needs.

SUMMARY

The embodied methods and systems are used for locating and providing accurate, high quality information across large multiple databases in the presence of data quality problems. The embodiments can be used for evaluating data quality in large relational or multiple databases with respect to specified integrity constraints and using multiple joined data paths to efficiently provide high quality information in the form of top-few, matched solutions or answers.

The embodiments include optimizing a query, which can include a first join path, a second join path, and an optimizer for evaluating a schema graph identifying the join paths between a field X and a field Y, and a value X=x, to identify the top-few values of Y that are reachable from a specified X=x value when using the join paths. In an embodiment, the query of the form can be optimized in the following manner: given a value X=x on field X in a table of a database identify the top-few values of Y, where Y is a different field of a table in the same or different databases, given a schema graph that identifies one or more joins paths from X to Y.

Further, the embodiments include scoring each data path that instantiates the schema join paths, evaluating the data quality with respect to specified integrity constraints, and using agglomeration scoring methodologies to efficiently provide high quality information and to alleviate data quality problems, such as data inconsistencies, default values, or other data inaccuracies.

For example, choosing one join path can lead to missing answers, whereas choosing multiple join paths can lead to conflicting answers. The embodiments permit the use of multiple join paths that are evaluated and scored to be used for computing the top-few answers or matches to a specified problem, as examples of high quality information.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the embodiments can be practiced or carried out in various ways.

The methods and systems employ novel techniques to limit probing of large multiple databases to efficiently compute the top-few answers to information queries in the presence of data quality problems within and across the large multiple databases. The query optimization technique disclosed herein includes a particular application to a large multiple database that can include up to many millions or billions of records managed by a database system (DBS), such as a legacy database system available through AT&T™.

The methods and systems can be used to locate high quality and accurate information from within and across multiple large databases in the presence of data quality problems. In particular, the methods use a schema graph to identify multiple join paths between two fields (such as, X and Y) and using a value of X=x to find those values of Y that are reachable from X=x using the multiple join paths, thereby yielding more complete and accurate answers.

The methods and systems are usable on very large databases or multiple databases that are needed for identifying associations within or across the multiple databases.

The embodiments include methods that provide the optimizing of an information query, in which the results of the query can be reached from a query node by following one or more join paths in a schema graph to find a value of Y for a specified value of X in the presence of the join paths. For example, a basic query can be given a value for a field of X, such as a telephone number; then, find a value for a field of Y, such as finding a circuit id in which the line for the telephone number is attached. Accordingly, the method and system can use an inventory database to look up the circuit ids and, then, use the known telephone number or X value to find Y or the corresponding circuit id.

A schema graph can be a 3-tuple (G, X, Y), where G=(V, E) is a directed acyclic graph, whose nodes V=(X, Y, ... ) are labeled by field names of accessible databases and E being a subset of VxV are directed edges. A directed path from X to Y in G can be referred to as a join path. The method can include evaluating the schema graph to identify the join paths between the field X and the field Y, and a specified value of X=x.

A join path can be used to answer an information query and can include both intra-table edges and inter-table edges, though "database-style joins" need to be performed only to recover the associations along inter-table edges of the join path. Thus, join paths in a schema graph can identify different ways in which a basic query can be answered.

To ensure that the join paths yield meaningful associations, a focus is placed on: all nodes in the schema graphs; the intra-table edges, which are always incident on a primary key; and the inter-table edges which correspond to the join paths and can include primary keys and foreign keys. The query nodes in the schema graphs can be the value of X as a source node and the value of Y as a sink node, and the query nodes in the schema graphs can be a primary key or a foreign key in their respective tables.

The method includes scoring each data path that instantiates the schema join paths and, then, evaluating the quality of the data from each scored data path with respect to specified integrity constraints to alleviate data quality problems and to provide high quality information.

Intra-table edges, with one of the fields as a key, can be used to capture a forward functional dependency, a backward functional dependency, or a symmetric functional dependency. If the keys are all exact keys, a default value does not exist and the edge weight equals 1. In the presence of data quality problems, the edge weights are less than 1—the smaller the edge weight, the poorer the aggregate quality of the intractable edge. Thus, the weights associated with the intra-table edges in the schema graph can identify data quality problems. Computer instructions on computer readable media can be used to identify a weight of the data edge and to score a data edge or intractable edge. The score of the data edge is computed as the product of the weights of the data edge and the corresponding schema edge.

An inter-table edge is always a join, with a primary key and/or foreign key, that can be exact or approximate. Quality problems arise when a value in a foreign key field does not occur in the primary key field, such as a default or dummy value, which indicates that a violation of referential integrity has occurred and a potential data quality problem is detected. The invention solves these quality problems.

The data path that instantiates the schema join paths is a sequential composition of data edges or data table edges, in which the data path score is the product of the scores of the constituent data edges or data table edges. If $sc_1$, $sc_2$, $sc_3$, ..., $sc_n$ are the scores of constituent data edges of a data path P, then the score of data path P is given by: sequential_com $(sc_i, 1 \leq i \leq n) = \Pi^n_{i=1}(sc_i)$.

Without data quality problems, the basic query of "given X=x, find Y" can be answered correctly by following all the join paths across the multiple data bases starting from X=x, and taking the union of all Y values that are reached along these individual paths. Data quality problems can be prevalent in large multiple databases. Accordingly, some margin of error might be considered due to the fact that the query is to be performed without prior knowledge of whether the database values are clean or not. For example, a primary key field might only be an approximate key and accordingly does not yield the desired answers. To alleviate the data quality problems from the desired answers and render the top-few high quality answers: the schema graph can be annotated with measures of aggregate data quality, based on how much the actual data set deviates from the ideal case, and the data-level edges, paths, and query answers can be scored by combining measures of the aggregate data quality at the schema level with a measure of deviation by individual data items from an ideal case.

The embodiments treat multiple evaluated data paths between the same nodes of X and Y as corroborating evidences and uses the data paths with X=x values and derived Y values to compute scores, wherein the scores are agglomerated for yielding overall scores for matching or pairing X=x values to a Y=y value. Accordingly, the scores of multiple data paths can be agglomerated using parallel composition to compute a score for a Y=y value. More formally, if $sc_1$, $sc_2$, $sc_3$, ..., $sc_n$ are the scores of individual data paths $P_i$, $1 \leq i \leq n$, between two nodes in the data graph, then, to ensure that all scores are in [0,1], the score of a parallel composition of the $P_i$'s is: parallel_com $(sc_i, 1 \leq i \leq n) = s1 + s2 - (s1*s2)$ where $s1 = sc_1$ and $s2 = $parallel_com $(sc_i, 2 \leq i \leq n)$. Multiple data paths between the same (x,y) pair can be agglomerated to yield scores for matching Y values.

The methods continue by finding the top-few Y=y values reachable from the specified X=x values when using the multiple join paths. The top-few Y=y values include the desired top-few answers or matched solutions to the request or problems resulting from the query, respectively. The score for the Y value $(y_i)$ is then computed. The score for the Y value $(y_i)$ can be the score of the parallel composition of all the data paths from the source X=x to the sink Y=$y_i$. This agglomerative scoring takes into consideration all the data paths.

In finding the top-few values for Y, the methods derive the answers from a score range in which the result is an actual set of answers and not a ranking. A specific value of x is given to the source node X in the schema graph, such that the data graph is instantiated with a unique (source) node $X_D$=X=x, where the value of x appears in the column X in the database. Any newly inserted data node $T_D$ in the data graph can include a set of open_edges $(T_D)$ to be the set of all schema edges that emanate from the corresponding node T in the schema graph. For example, for a schema graph node X=TN in some database LDW and a x value of 555-5555 (telephone number), the data graph is instantiated with a single node LDW.TN. 555-5555. The set open-edges (LDW.TN. 555-5555) can include schema edges: (LDW.TN, LDW.PON) and (LDW.TN, LDW.CustName) which correspond to schema edges that relate a telephone number (TN) to provisioning order numbers (PON) and customer names (CustName) in database LDW.

The methods further evaluate costs for a plurality of multiple join paths in implementing a query. The number of queries sent to a particular integration platform database server can be used to create a cost metric. The cost metric can be applied to a grouping of multiple queries, wherein a unit cost is assigned to a particular grouping based on the cost metric for the grouping of multiple queries.

The embodiments include systems for probing of large multiple databases to efficiently compute the top-few answers to information queries in the presence of data quality problems within and across the large multiple databases. The systems include a massively parallel processing and composition system including one or more nodes; a plurality of central processing units (CPU) with each of the one or more nodes provide access to the central processing units; a plurality of virtual processors where each central processing unit provides access to the one or more virtual processors, and an optimizer.

Each virtual processor is configured to manage data stored in one of a plurality of data storage facilities. An optimizer is responsible for optimizing a response to an information query, wherein the query result can be reached from a query node by following one or more join paths in a schema graph to find a value of Y for a specified value of X=x in the presence of the join paths. The join paths with X=x values and derived Y values are agglomerated to identify the top-few Y=y values reachable from the specified X=x values when using the join paths. These top-few Y=y values provide the desired top-few answers or matched solutions resulting from the query. The optimizer can include an extended join technique that uses multiple join multiple paths in a schema graph. The optimizer uses data paths individually to instantiate schema join paths and form a score.

The methods prune partially evaluated data paths to compute the top few answers within a join path framework.

The methods provide a technique to take data quality into account in assigning data path scores to various data paths, agglomerating these scores to assign a score to each matching Y value, and the pruning partially evaluated data paths to compute top few Y values.

Figure 1:
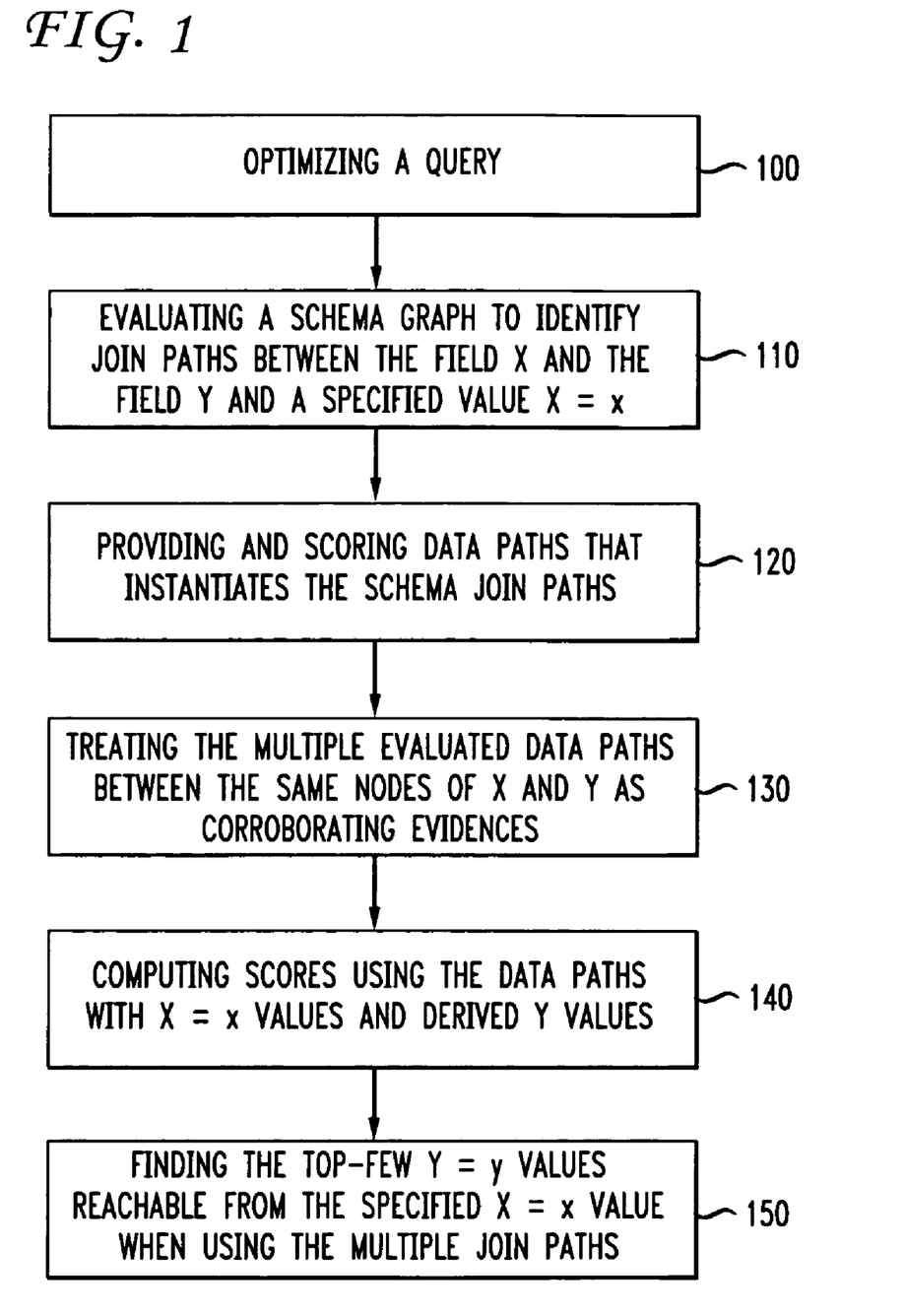
FIG. 1 is an embodiment of a method for probing of large multiple databases to efficiently compute the top-few answers to information queries in the presence of data quality problems within and across the large multiple databases.

With regard to the figures, FIG. 1 is an embodiment of a method for probing of large multiple databases to efficiently compute the top-few answers to information queries in the presence of data quality problems within and across the large multiple databases. The methods entail optimizing a query (Step 100). A query result can be reached from a query node by following one or more join paths in a schema graph. The schema graph includes an X field, an Y field, and a join path between the X and Y fields. The join paths can be inter-table edges, intra-table edges, and combinations thereof. The query result is reached by following the join paths in a schema graph to find a value of Y for a specified value of X in the presence of the join paths. Query nodes can be used in the schema graphs, wherein X is a source node and Y is a sink node.

The schema graph is evaluated to identify join paths between the X field and the Y field, and a specified value X=x (Step 110). Data paths that instantiates the schema join paths are established and scored (Step 120); The scoring of these data paths can be achieved using a sequential composition of scores of the constituent data edges.

Each scored data path and the associated quality of the data are evaluated with respect to specified integrity constraints (Step 130). The evaluation of the each scored data path and the associated quality of the data is performed by treating the multiple evaluated data paths between the same nodes of X and Y as corroborating evidence.

From X values and derived Y values, scores are computed using the data paths (Step 140). The scores are agglomerated for yielding overall scores for matching or pairing X=x values to Y=y values. The score for the Y value can be computed by agglomerating the scores of the data paths using parallel composition to compute the score for a Y value. An overall score for the value of Y=y can be computed as the score of the parallel composition of the data paths from a source X=x values to a sink Y=y values.

The top few Y=y values reachable from the specified X=x value when using the multiple join paths are then identified (Step 150). The top-few Y=y values are the desired top-few answers or matched solutions resulting from a query.

The methods can entail the step of evaluating a cost for multiple join paths to implement the query. The number of queries can be used to create a cost metric, and the cost metric can be minimized by grouping the multiple queries.

As an example of the embodied system, the following is an example architecture for a node of the database system. A database system node can include one or more processing modules connected by a network. The network manages the storage and retrieval of data in one or more data storage facilities. Each of the processing modules can be one or more physical processors or each can be a virtual processor with one or more virtual processors running on one or more physical processors.

For the case in which N virtual processors are running on an M-processor node, the node's operating system schedules the N virtual processors to run corresponding M physical processors, so each virtual processor runs on its own physical processor.

Each of the processing modules manages a portion of a database that is stored in a corresponding data storage facilities. Each of the data storage facilities can include one or more disk drives. The database system can include multiple nodes thereby extending the network.

The system stores data in one or more tables in the data storage facilities. The rows of the tables can be stored across multiple data-storage facilities to ensure that the system workload is distributed evenly across the processing modules. A parsing engine organizes the storage of data and the distribution of table rows among the processing modules. The parsing engine can coordinate the retrieval of data from the data storage facilities in response to queries received from a user at a client computer, which can be a server. The database system can receive queries in a format such as SQL.

The embodiments include computer readable medium having stored thereon a plurality of instructions, the plurality of instructions including instructions which, when executed by a processor, cause the processor to perform the embodied methods for locating and providing accurate, high quality information across large multiple databases in the presence of data quality problems.

Figure 2:
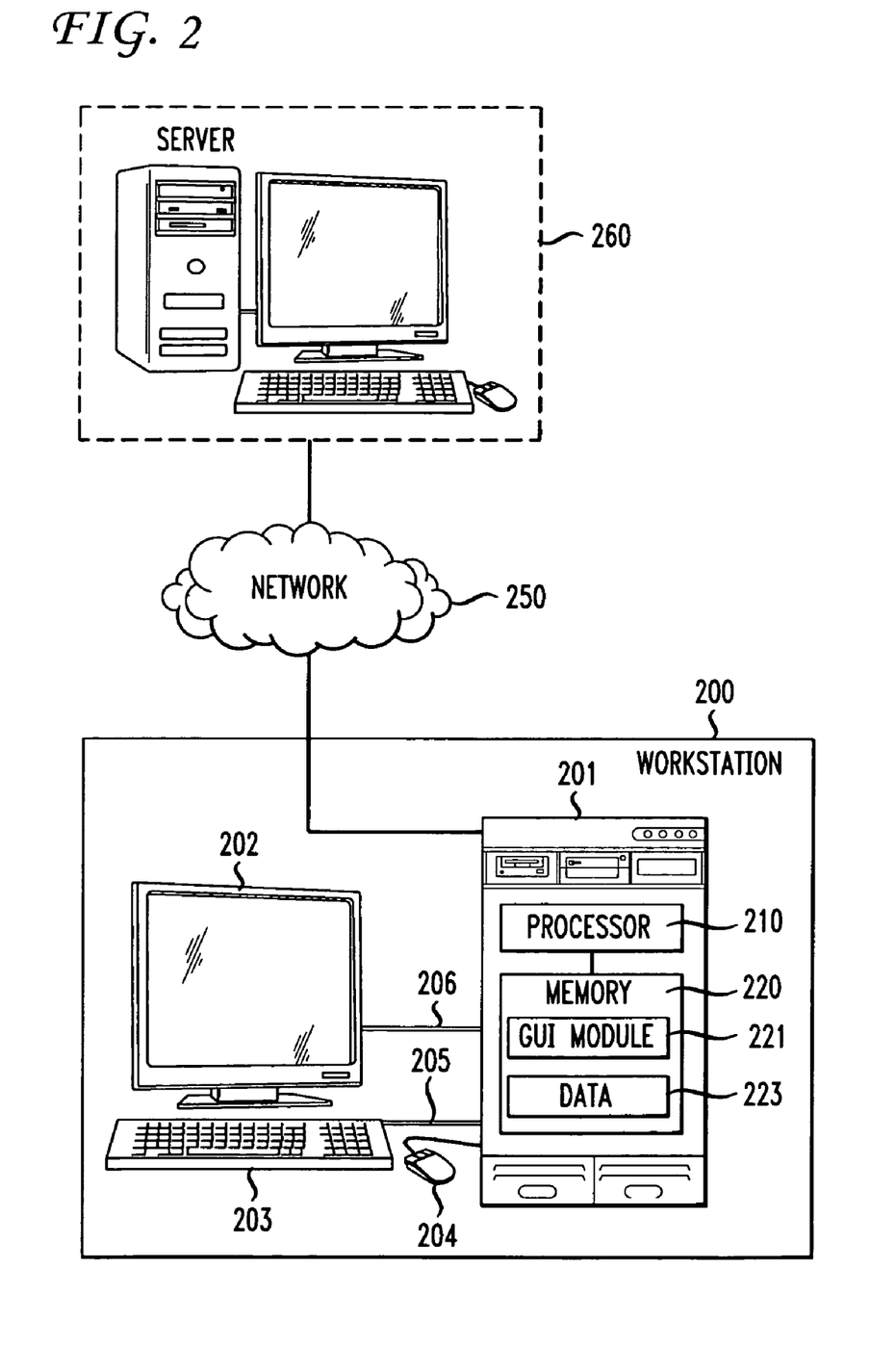
FIG. 2 depicts an illustration of a computer system to perform the embodied methods.

FIG. 2 depicts an illustration of a computer system to perform the embodied methods. A workstation 200 includes computer 201, which can be coupled to a video display 202 via an external graphics bus 206. The external graphics bus 206 can be an Advanced Graphics Port (AGP) compliant bus. The term "coupled" encompasses a direct connection, an indirect connection, or the like. Computer 201 in one embodiment includes a processor 210, such as the Pentium™ III processor manufactured by Intel Corp. of Santa Clara, Calif. In another embodiment, the processor 210 can be an Application Specific Integrated Circuit (ASIC). Computer 201 can include a memory 220 coupled to the processor. Memory 220 encompasses devices adapted to store digital information, such as Dynamic Random Access Memory (DRAM), Rambus™ DRAM (RDRAM), flash memory, a hard disk, an optical digital storage device, a combination thereof, etc. The computer 201 can be coupled to a keyboard 203 and a mouse 204 via an external computer bus 205. In one embodiment, the external computer bus 205 is a Universal Serial Bus (USB) compliant bus.

Memory 220 can include instructions adapted to be executed by the processor 210 to perform a method in accordance with an embodiment of the present invention. The term "instructions adapted to be executed" is meant to encompass any instructions that are ready to be executed in their present form (for example, machine code) by a processor, or require further manipulation (for example, compilation, decryption, decoding, or provided with an access code, etc.) to be ready to be executed by a processor (for example, processor 210). In one embodiment, the memory 220 can include a graphical user interface (GUI) module 221 to implement a graphical user interface.

In another embodiment, the workstation 200 is coupled to a server 260 via a network 250. Examples of network 250 include the internet, a WAN (wide area network), LAN (local area network), an intranet, a communications network, a computer network, a combination thereof, etc. In one embodiment, the server 260 is coupled to a storage device that typically stores data on a magnetic medium such as a magnetic disk. For example, the storage device may store application programs and associated data files/documents. Examples of documents include word processing documents, spreadsheet documents, HTML (Hypertext Markup Language) documents, and the like. Workstation 200 can access data stored in the storage device via server 260 and network 250. In an embodiment, server 260 can display information on display 202 by sending information signals to workstation 200 via network 250. Examples of display information include data a GUI component, a web page, and the like.

Data 223 can encompass hierarchical data, non-hierarchical data, and the like. Data 223 can be a document corresponding to a particular application such as a word processing document, a spreadsheet document, an HTML document, and the like.

Computer instructions adapted to be executed by a processor to perform the embodied methods are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah (Zip™ is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

While these embodiments have been described with emphasis on the embodiments, it should be understood that within the scope of the appended claims, the embodiments might be practiced other than as specifically described herein.

What is claimed is:

1. A computer implemented method comprising:
   a. optimizing a query, wherein a query result is reached from a query node by following one or more join paths in a schema graph to find a Y value for a specified value X in the presence of the join paths, wherein the schema graph comprises a field X and a field Y;
   b. evaluating the schema graph identifying the join paths between the field X, and the field Y, and the specified value X;
   c. providing individual data paths that instantiate the join paths wherein at least one of the individual data paths includes an intra-table edge including a key field;
   d. evaluating and scoring each data path with respect to specified integrity constraints for measuring aggregate data quality wherein said evaluating and scoring includes assigning a weighting to the intra-table edge wherein the assigned weighting is indicative of an extent to which the key field in the intra-table edge deviates from an exact key;
   e. computing scores using the scored data paths with X values and derived Y values, wherein the scores are agglomerated for yielding overall scores for matching or pairing X values to Y values; and
   f. finding the Y values reachable from the specified value X when using the multiple join paths.

2. The computer implemented method of claim 1, wherein the join paths comprise inter-table edges, intractable edges, and combinations thereof.

3. The computer implemented method of claim 1, wherein the scored data path is a sequential composition of data edges or data table edges.

4. The computer implemented method of claim 1, further comprising the step of using query nodes in the schema graphs, wherein X is a source node and Y is a sink node.

5. The computer implemented method of claim 1, further comprising the step of providing a score for a Y value, wherein the score for the Y value comprises agglomerating the scores of the scored data paths using parallel composition to compute the score for a Y value.

6. The computer implemented method of claim 1, further comprising computing an overall score for the value of Y=y as the score of the parallel composition of the scored data paths from a source X=x values to a sink Y=y values.

7. The computer implemented method of claim 1, further comprising the step of evaluating a cost for the multiple join paths to implement the query, wherein the step of the number of queries is used to create a cost metric, and wherein the cost metric is minimized by grouping the multiple queries.

8. A computer readable medium having stored thereon a plurality of computer instructions, the plurality of computer instructions including computer instructions which, when executed by a processor, cause the processor to perform the steps of:
   a. optimizing a query, wherein a query result is reached from a query node by following one or more join paths in a schema graph to find a Y value for a specified value X in the presence of the join paths, wherein the schema graph comprises a field X and a field Y;
   b. evaluating the schema graph identifying the join paths between the field X, and the field Y, and the a specified value X;
   c. providing individual data paths that instantiate the join paths wherein at least one of the individual data paths includes an intra-table edge including a key field;
   d. evaluating and scoring each data path with respect to specified integrity constraints for measuring aggregate data quality wherein said evaluating and scoring includes assigning a weighting to the intra-table edge wherein the assigned weighting is indicative of an extent to which the key field in the intra-table edge deviates from an exact key;
   e. computing scores using the scored data paths with X values and derived Y values, wherein the scores are agglomerated for yielding overall scores for matching or pairing X values to Y values; and
   f. finding the Y values reachable from the specified value X when using the multiple join paths.

9. The computer readable medium of claim 8, further comprising executable computer instructions that cause a computer to use using query nodes in the schema graphs, wherein X is a source node and Y is a sink node.

10. The computer readable medium of claim 8, further comprising executable computer instructions that cause a computer to provide a score for a Y value, wherein the score for the Y value comprises agglomerating the scores of the scored data paths using parallel composition to compute the score for a Y value.

11. The computer readable medium of claim 8, further comprising executable computer instructions that cause a computer to calculate an overall score for the value of Y=y as the score of the parallel composition of the scored data paths from a source X=x values to a sink Y=y values.

12. The computer readable medium of claim 8, further comprising executable computer instructions that cause a computer to evaluate a cost for the multiple join paths to implement the query, wherein the step of the number of queries is used to create a cost metric, and wherein the cost metric is minimized by grouping the multiple queries.

13. A system for accessing a database server, wherein the system comprises:
   a. a massively parallel processing and composition system comprising at least one node;
   b. at least one central processing unit, wherein each node is accessed by the central processing units;
   c. a plurality of virtual processes, wherein each virtual process is accessed by the central processing units, wherein each virtual process is configured to manage data stored in at least one data storage facility; and
   d. an optimizer for optimizing a response to a query, wherein the query result is reached from a query node by following one or more join paths in a schema graph to find a value of Y for a specified value of X=x in the presence of the join paths, wherein the join paths with X=x values and derived Y values are evaluated and scored with respect to specified integrity constraints for measuring aggregate data quality, and wherein the scores are agglomerated for finding the top-few Y=y values reachable from the specified X=x values when using the join paths, wherein said evaluating and scoring of the join paths includes providing individual data paths that instantiate the join paths wherein at least one of the individual data paths includes an intra-table edge including a key field and wherein said evaluating and scoring includes assigning a weighting to the intra-table edge wherein the assigned weighting is indicative of an extent to which the key field in the intra-table edge deviates from an exact key.

14. The system of claim 13, wherein the optimizer further comprises a process for evaluating the cost of a plurality of different join paths to implement the query.

* * * * *

UNITED STATES PATENT AND TRADEMARK OFFICE
CERTIFICATE OF CORRECTION

PATENT NO.        : 7,630,967 B1                                        Page 1 of 1
APPLICATION NO.   : 11/285051
DATED             : December 8, 2009
INVENTOR(S)       : Divesh Srivastava and Ioannis Kotidis It is certified that error appears in the above-identified patent and that said Letters Patent is hereby corrected as shown below:

Please correct Col. 1 Claim 2 as follows:

2. The computer implemented method of claim 1, wherein the join paths comprise inter-table edges, ~~intractable~~ <u>intra-table</u> edges, and combinations thereof.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,630,967 B1
APPLICATION NO. : 11/285051
DATED : December 8, 2009
INVENTOR(S) : Divesh Srivastava and Ioannis Kotidis It is certified that error appears in the above-identified patent and that said Letters Patent is hereby corrected as shown below:

Please correct Col. 8 Claim 2, lines 3-5 as follows:

2. The computer implemented method of claim 1, wherein the join paths comprise inter-table edges, ~~intractable~~ intra-table edges, and combinations thereof.

This certificate supersedes the Certificate of Correction issued January 19, 2010.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,630,967 B1
APPLICATION NO. : 11/285051
DATED : December 8, 2009
INVENTOR(S) : Srivastava et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this

Second Day of November, 2010

David J. Kappos
*Director of the United States Patent and Trademark Office*